United States Patent
Hanson (10) Patent No.: US 6,269,151 B1
(45) Date of Patent: Jul. 31, 2001

(54) SYSTEM AND METHOD FOR DELIVERING VOICE MESSAGES TO VOICE MAIL SYSTEMS

(75) Inventor: Bruce Lowell Hanson, Little Silver, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/042,313

(22) Filed: Mar. 13, 1998

(51) Int. Cl.[7] .................................................. H04M 3/22
(52) U.S. Cl. .................................................................. 379/69
(58) Field of Search .............................. 379/69, 80, 269, 379/309

(56) References Cited

U.S. PATENT DOCUMENTS

| 4,696,031 | * | 9/1987 | Frendberg et al. | 379/69 |
| 4,941,168 | * | 7/1990 | Kelly, Jr. | 379/69 |
| 5,075,894 | * | 12/1991 | Iwase et al. | 379/69 |
| 5,371,787 | * | 12/1994 | Hamilton | 379/69 |
| 5,404,400 | * | 4/1995 | Hamilton | 379/69 |
| 5,638,424 | | 6/1997 | Denio et al. | 379/67 |
| 5,644,624 | * | 7/1997 | Caldwell | 379/69 |

* cited by examiner

*Primary Examiner*—David D. Knepper
(74) *Attorney, Agent, or Firm*—Morgan & Finnegan, L.L.P.

(57) ABSTRACT

A system of delivering a message to a voice messaging system, coupled to a telephone extension, calls a telephone number received from a database. Subsequently, the call is monitored for speech energy and for a continuous silence interval after speech has been detected. Finally, a message is played to a voice messaging system after the continuous interval of silence expires.

15 Claims, 5 Drawing Sheets

SYSTEM AND METHOD FOR DELIVERING VOICE MESSAGES TO VOICE MAIL SYSTEMS

FIELD OF THE INVENTION

The present invention relates to communication systems and methods. In particular, the present invention relates to the delivery of pre-recorded voice messages to voice messaging systems over a telecommunications network.

BACKGROUND OF THE INVENTION

Pre-recorded voice message delivery systems which place calls to recipients' telephones have conventionally been optimized for delivery to a live person. These delivery systems detect when a call has been answered and begin playing pre-recorded messages (or provide some kind of "audio logo") as soon as possible in order to discourage the live party from hanging up before the message can be delivered.

Other conventional pre-recorded message delivery systems (and some live telemarketing systems), attempt to distinguish between a live answer and an answering device, and deliver a message (or connect a service representative) accordingly. The presence of an answering device is conventionally detected by live callers monitoring for a tone typically associated with answering devices. Due to the large variation among tones produced by different models of answering devices, automatically distinguishing an answering device tone from other sounds likely to be present in the call has proven unreliable.

Still other conventional pre-recorded message delivery systems begin to play a pre-recorded message as soon as the call has been answered. These systems do not distinguish when an answering machine begins to record. Rather, these systems play the same message, or portions thereof, more than once to ensure that the entire message is recorded by the answering device. This results in a recording on the recipient answering machine that will most likely not start at the beginning of the pre-recorded message.

In yet another variation, some systems attempt to distinguish live callers from answering machines. Live parties are distinguished typically by the presence of a continuous period of silence of approximately 1 to 1.5 seconds in the 4 seconds after detecting speech from the call. When this occurs, the call is classified as to a live party and a message is immediately begun or a representative immediately connected in order to discourage the called party from hanging up. Otherwise, after 4 seconds of speech has been received, these systems wait for 3 seconds of continuous silence and then deliver a message to what is classified as an answering machine. Unfortunately, with this system, answering machines will sometimes be falsely classified as live parties. This may result in no message, a wrong message, or only part of a message being left on the answering device.

It would be desirable to deliver complete, pre-recorded voice messages directly to answering devices (or voice messaging systems) without having to detect an answering machine tone. It would also be desirable to optimize message delivery systems for voice mail delivery to deliver correct, complete, pre-recorded voice messages to voice messaging systems.

SUMMARY OF THE INVENTION

According to the present invention, a system and method are provided to optimize for delivering a message to voice messaging systems. The system and method are optimized for message delivery "after hours," when people are unlikely to be present to answer the call. The method includes the steps of calling a telephone number retrieved from a database, monitoring the call for a beginning of speech energy after an answer supervision signal has been received, and then monitoring the call for silence for a continuous silence interval. The continuous silence interval has a duration independent of an elapsed time from the beginning of the speech energy and is chosen to optimize for delivery to a voice messaging system. This eliminates problems associated with early delivery of a message to a voice messaging system falsely classified as a live party. Subsequently, a message is played to the telephone extension after the continuous interval expires.

The messaging system comprises a memory having a message database including a voice message to be played and a telephone database including a plurality of telephone numbers. The system also includes a network interface coupled to a telecommunications network, and a processor coupled to both the memory and the network interface. The processor retrieves from the telephone database one of the telephone numbers and places a call to a telephone extension corresponding to the retrieved telephone number through the network interface. Subsequently, the processor plays the voice message stored in the message database during the call after detecting a beginning of speech energy and thereafter a continuous silence interval from the telephone extension.

BRIEF DESCRIPTION OF THE DRAWINGS

The above-described features and advantages of the present invention will be more fully appreciated with reference to the appended drawings and detailed description.

DETAILED DESCRIPTION OF THE INVENTION

Figure 1:
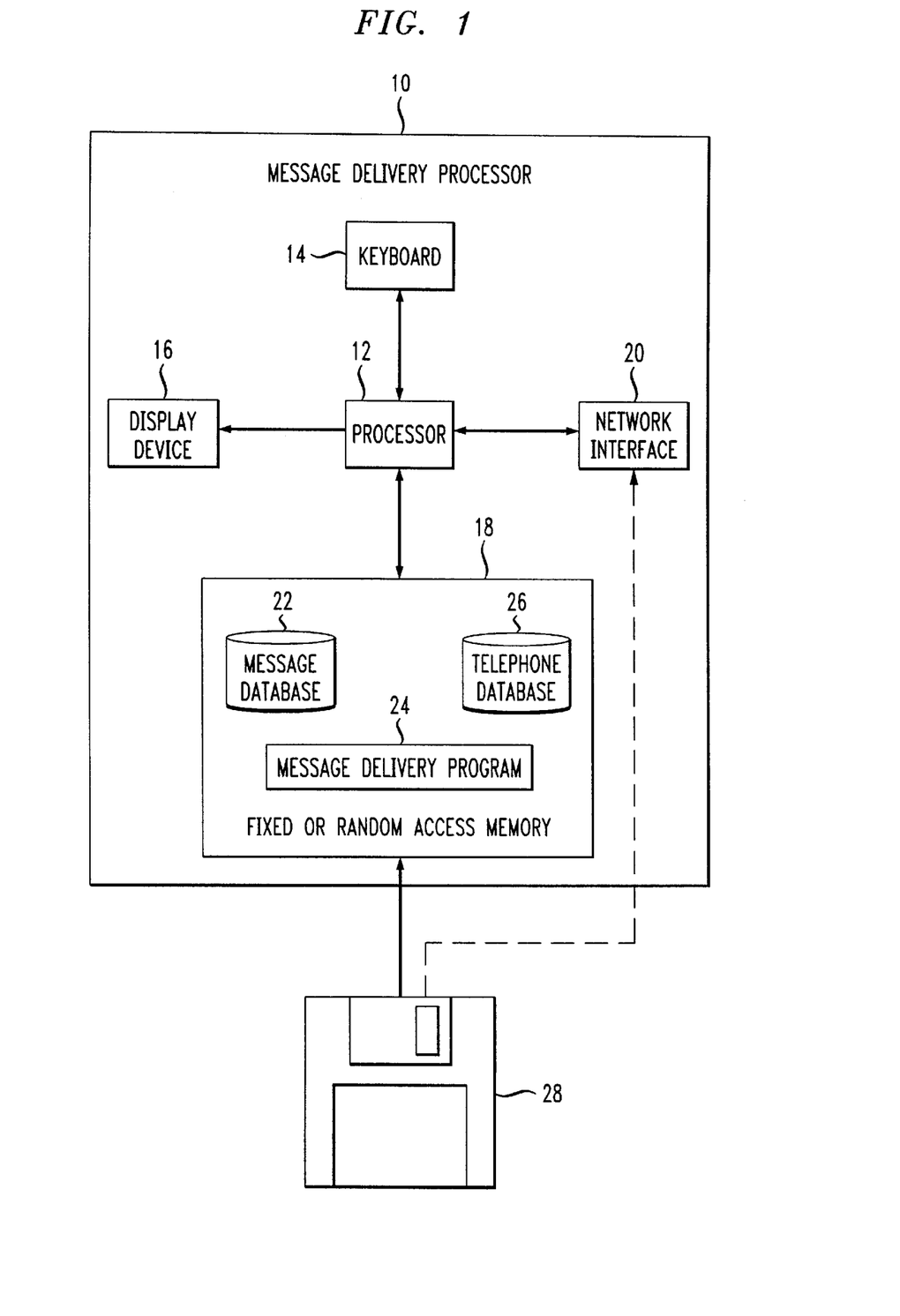
FIG. 1 depicts a message delivery processor according to the present invention.
Figure 3:
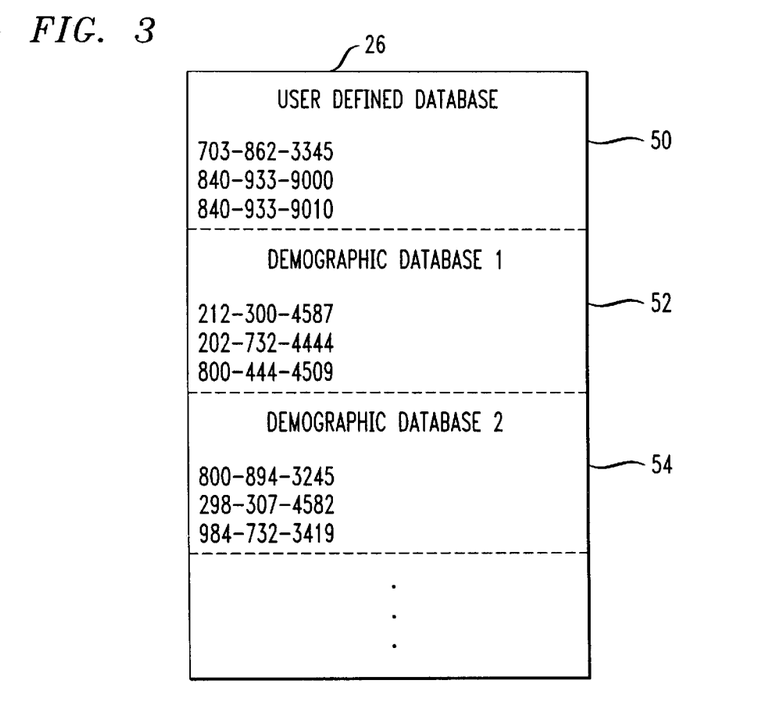
FIG. 3 depicts a telephone database including stored telephone numbers associated with a plurality of groups.

FIG. 1 depicts a message delivery processor 10. The message delivery processor 10 includes a processor 12 coupled to a keyboard 14, a display device 16, a fixed or random access memory 18, and a network interface 20. The memory 18 includes a message database 22, a telephone database 26 and a message delivery program 24. The message database 22 includes at least one stored message. Each stored message is typically a voice message recorded by a person who, on behalf of himself or a corporation, desires to convey the message to a plurality of other individuals or corporations. The telephone database 26, includes a plurality of stored telephone numbers. As shown in FIG. 3, the telephone database 26 may include a plurality of groups of telephone numbers. For example, the person or corporation desiring to transmit the message may define a group of telephone numbers which should be called for message delivery. This is indicated as user defined database 50. Additionally, one or more demographic databases 52 or 54 may be present or defined within database 26, each having a plurality of telephone numbers of people that share a common characteristic. Each particular demographic may be based on anything, including ethnicity, purchasing patterns, status within a corporation, etc. . . .

The network interface 20 couples the processor 12 to a telecommunications network. The keyboard 14 allows an individual at the message delivery processor to update the telephone database and/or enter commands to the message delivery processor. The display device 16 allows display of the telephone database as well as other information regarding the message delivery processor 10. Both the contents of the message database 22 and the telephone database 26 may be interactively entered by a remote telephone or computer system through network interface 20. For example, a person may call the message delivery processor 10 and through an interactive menuing system may record a message for delivery at a later time. Similarly, the person may enter telephone numbers for storage within a user defined portion 50 or other portion of database 26. The interactive menuing system may include recognition of Dual Tone Multi Frequency ("DTMF") tones or may include recognition of spoken words through well known automatic speech recognition ("ASR") processes. Alternatively, a message or a plurality of telephone numbers may be stored on a computer usable medium 28. The messages and telephone numbers on the computer usable medium 28 may then be uploaded to memory 18 directly or through network interface 20 for later use. Also, instead of storing the pre-recorded message in a message database, the message may be stored using a conventional analog sound recording device under control of the processor 12.

Figure 2:
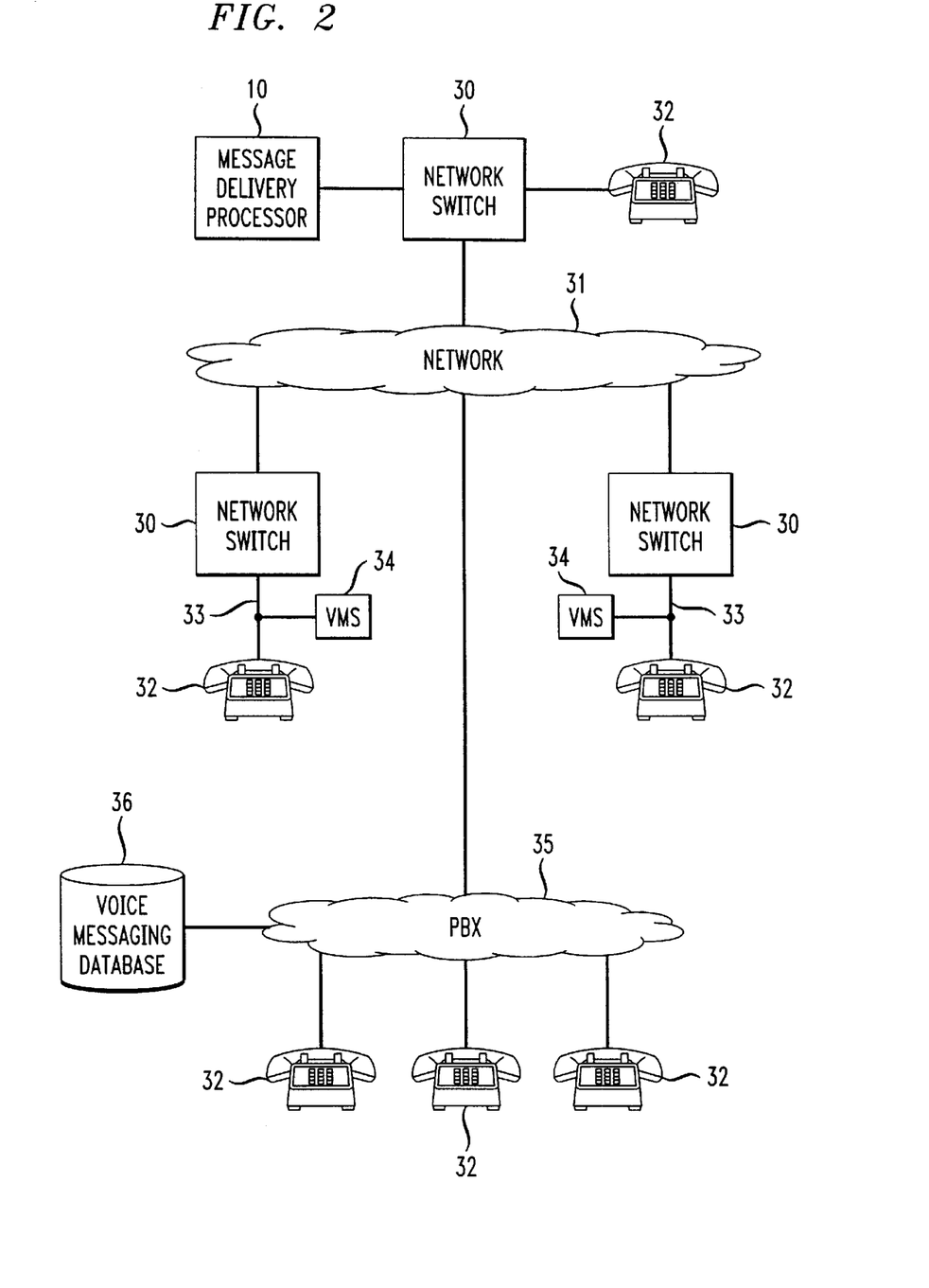
FIG. 2 depicts a telecommunications network incorporating a message delivery processor and a plurality of telephones and voice messaging systems.

Referring to FIG. 2, the message delivery processor 10 is shown as part of a telecommunications network. The message delivery processor 10 is coupled to a network switch 30 and a plurality of telephones 32 and voice messaging systems 34 through a telecommunications network 31. The message delivery processor may be coupled to a network switch 30 through a high bandwidth "T1line." Conversely, the message delivery processor 10 may be part of the network switch 30 or may be coupled to the network switch 30 through a local area network. The telecommunications network 31 includes a plurality of network switches 30 which are geographically distributed and interconnected to provide telecommunication services. The telecommunications network is typically the public telephone network. Each network switch 30 is coupled to a plurality of telephone lines or extensions 33. Each extension 33 is typically connected to a telephone 32 and a voice messaging system 34, although only one or the other may be present. The voice messaging system 34 is conventionally a device which becomes activated after a predetermined number of telephone rings. The voice messaging device 34, once activated, conventionally plays a pre-recorded message followed by a tone after which the caller is invited to speak to record a message.

The telecommunications network 31 is also coupled to a plurality of PBX switches indicated by PBX switch 35 in FIG. 2. The PBX switch 35 is typically a network switch which services a single entity such as a corporation. The PBX switch 35 is in turn coupled to a plurality of telephones 32. The PBX switch 35 is also coupled to a voice messaging database 36. The voice messaging database 36 is capable of storing recorded voice messages for each of the extensions of the telephones 32 coupled to the PBX 35. The voice messaging database 36 performs conventionally the same functions as the voice messaging system 34 coupled to network switches 30. The terms voice messaging database and voice messaging system will be used interchangeably within the application and are intended to be treated as equivalents.

Figure 4:
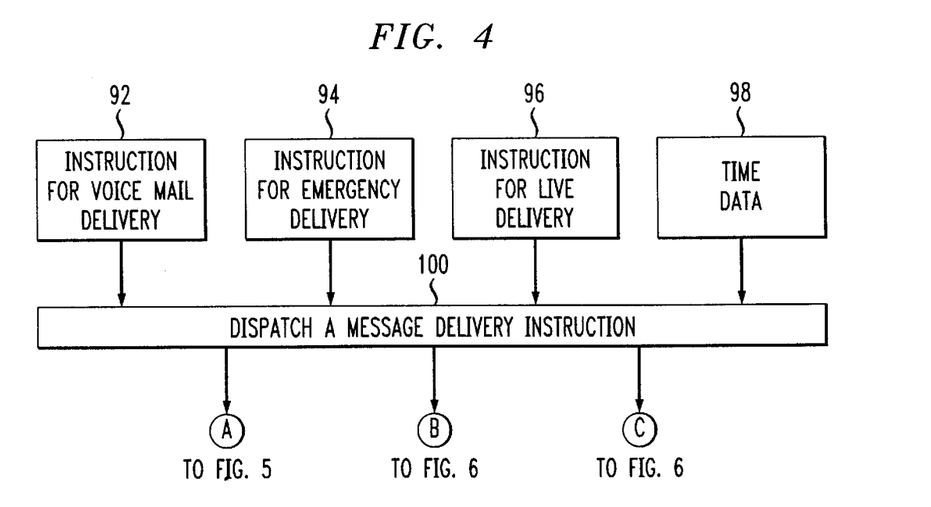
FIG. 4 depicts a method of directing a message delivery instruction according to the present invention.

The message delivery processor 10, shown in FIG. 1, operates as follows. A message delivery program 24, residing in the memory 18, includes program instructions for execution by the processor 12. The program instructions for execution by the processor 12 are influenced by the message delivery instruction programmed by a person or corporation who desires to send a messages as well as the time of day. This is illustrated in FIG. 4. Referring to FIG. 4, a message delivery instruction is dispatched in step 100 based on several different inputs or conditions. For example, in step 92, the sender may instruct the message delivery processor 10 to optimize for voice mail delivery "after hours". Additionally, the sender may instruct the message delivery processor to deliver the message pursuant to the emergency message delivery method in step 94. In step 96, the sender may instruct the message delivery processor 10 to optimize for live delivery. In step 98, the present time data is input to the message dispatch step 100. These inputs 92–98 affect the dispatch of message delivery instructions in step 100. When the instruction is to optimize for voice mail delivery in step 92, and the time data delivered in step 98 indicates that the time is "after hours", the message delivery instruction is dispatched in step 100 to the method steps after step A illustrated in FIG. 5. Similarly, when the instruction is indicated to be for emergency delivery in step 94, the instruction is dispatched in step 100 to the method steps following step B illustrated in FIG. 6. In the case of emergency delivery, typically the time data input in step 98 is not relevant to the determination of whether to dispatch the instruction because it is assumed that the sender desires immediately delivery. Similarly, when the instruction is specified by the sender to be for live delivery in step 96, the message delivery instruction is dispatched in step 100 to the steps following letter C illustrated in FIG. 6. The instruction for live delivery may also include black out periods during which message delivery should not be attempted. During such black out periods, indicated by the time data input in step 98, the instruction will not be dispatched in step 100 to the steps following step C until such black out period ends. In this manner, instructions are directed to different method delivery paths in step 100 based both on the intent of the sender and the time of day.

Figure 5:
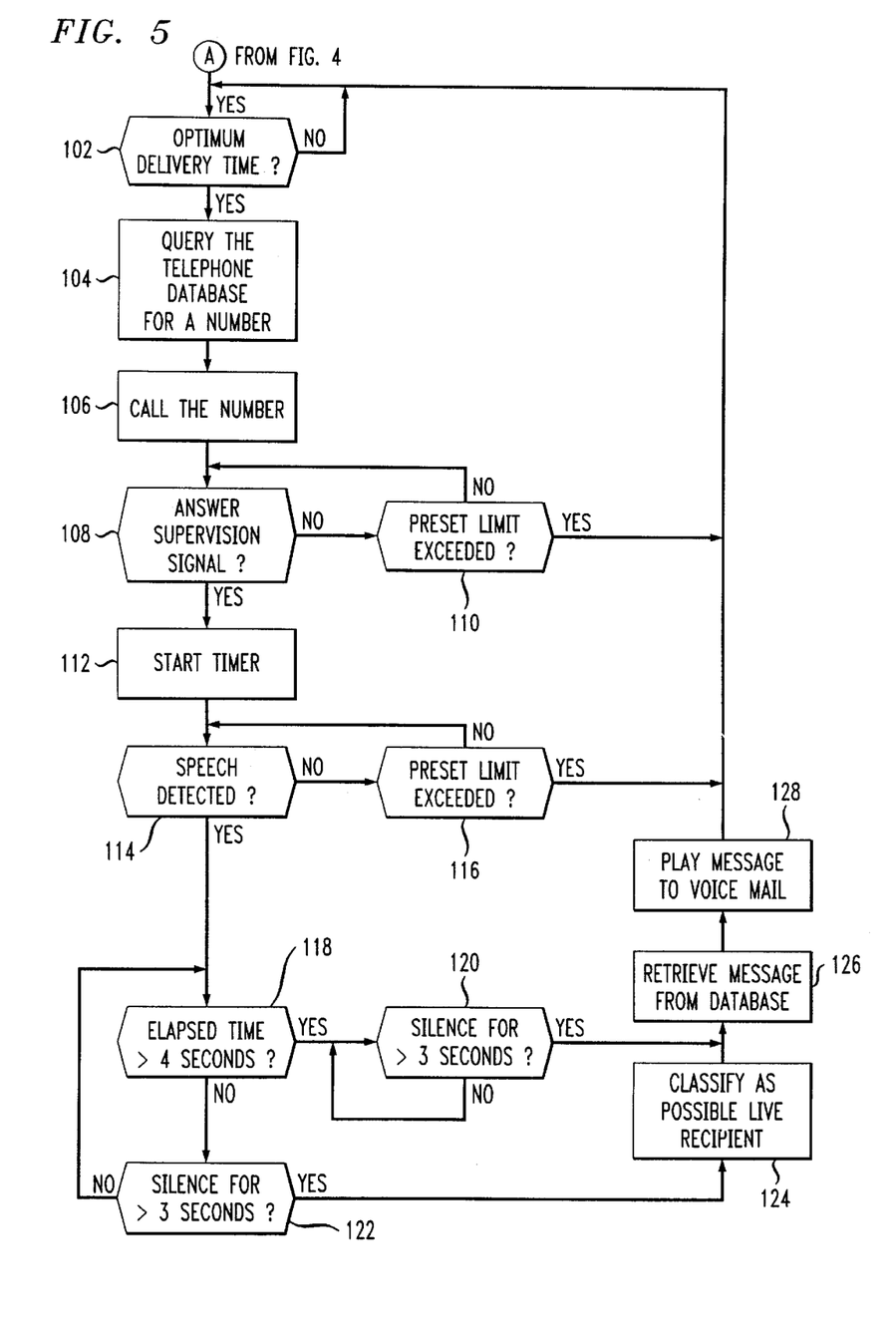
FIG. 5 depicts a method of delivering a message to a voice messaging system according to the present invention.

After the processor 12 determines in step 100 that the instruction is for voice mail delivery, step 102 begins. In step 102, the processor 12 determines whether the delivery time specified in the instruction has arrived. If not, step 102 is repeated. If so, step 104 begins. In step 104, the processor 12 queries the telephone database 26 for a telephone number to call. In step 106, the processor 12 places a call through the network interface 20 over the telecommunications network 31 to the remote telephone extension 33 corresponding to the telephone number retrieved from the database 26. It will be appreciated that in step 106, multiple calls may be placed in parallel by the processor 12. The called telephone extension 33 may be coupled to either a network switch 30 or a PBX 35. In addition, the called extension is coupled to either or both of a telephone 32 and a voice messaging system 34.

In step 108, the processor detects whether an answer supervision signal has been received. The answer supervision signal indicates when and if the call has been answered. If the call has not been answered, in step 110, the processor 12 determines whether a preset time limit or number or rings (for example 10 rings) has been exceeded. If so, the processor 12 determines that the call will not be answered and then step 102 resumes. In addition, the processor 12 places the call back in a queue for later delivery. The processor 12 may further indicate to the telephone database 26 that a telephone call to a particular telephone number was unsuccessful. This may be indicated in any convenient manner, for example, by associating with the called number in the database 26 the letter "N" to indicate that the message was not delivered or "CB" to indicate that the number should be called back. There are numerous methods of queuing calls to telephone numbers within a database, and indicating the success or failure of calls made to each number within the database, which are well known in the art and may be used to implement the above described queue.

If the preset time limit has not been exceeded in step 110, the processor continues to attempt to detect the answer supervision signal in step 108. If an answer supervision signal has been received, then step 112 begins. In step 112, the processor 12 starts a timer. In step 114, the processor 12 detects whether speech energy or other sounds are present at the telephone extension called. If no speech energy or sound is present in step 114, in step 116 the processor 12 determines whether a predetermined time limit has been exceeded. If not, the processor 12 continues to detect the speech energy in step 114. If the preset time limit is exceeded in step 116, then the telephone number is put back into the queue and step 102 begins again.

When speech is first detected, the processor 12 notes the start time and in step 118 determines whether the elapsed time since speech began has exceeded four seconds. If not, step 122 begins. If so, step 120 begins. While 4 seconds has been illustratively chosen in step 118, any other convenient period of time may be selected. The period of time selected for step 118 is chosen to facilitate classifying calls as either to a live recipient or to an answering device. The period of time is optimally correlated with the expected duration of a live callers' initial greeting. For example, the greeting "Hello?" may be expected and is well suited for a 3 second time interval. Whereas, "Hello, you have reached the corporate headquarters of AT&T, whom are you trying to reach" or something similar may be expected. In this case, a period of time of longer than 4 seconds is optimal to distinguish live callers. Therefore, the period of 4 seconds is illustratively chosen and may be increased or decreased depending upon an expected greeting length given the particular demographic to be called. It has been empirically determined for business calls that if a period of silence occurs before 4 seconds of speech are detected, the call is likely to have been answered by a live recipient. If a period of silence does not occur until after 4 seconds of speech have elapsed, it is most likely that the call has been answered by an answering device.

In steps 120 and 122, a processor 12 listens for a preset time interval of silence. If in step 122 silence is detected for more than 3 seconds within the first 4 seconds of speech receipt of the answer supervision signal, then in step 124, the call is classified as possibly being to a live recipient. This information may in turn be stored in the call queue for subsequent action such as repeating the message delivery. Subsequently, steps 126 and 128 occur as previously described. Then step 102 resumes. It has been empirically determined that the optimum preset time interval used in steps 120 and 122 is between 1 and 5 seconds. More particularly, a preset time interval of between 2.7 and 3.5 seconds and around 3 seconds is preferred. If silence is detected for the preset time interval in step 120, then in step 126 the processor 12 retrieves the recorded message from the message database 22. Then in step 128, the processor 12 plays the retrieved message to the voice messaging system at the called telephone extension 33. When the retrieved message has finished playing, step 102 resumes. If the delivery time is still optimal for reaching a voice messaging system in step 102, then the process begins again and the processor 12 queries the telephone database 26 for another specified telephone number to call. If there are no more telephone numbers specified within the telephone database 26 to call, the process ends.

A user may issue a message delivery instruction for emergency delivery. Emergency instructions may specify, for example, immediate message delivery regardless of the time of day to live parties at telephone numbers specified in the database 26. In this scenario, in step 100, the processor determines that an emergency delivery instruction has been received and dispatches the instruction to step 200 of FIG. 5. In step 200, the processor 12 queries the database 26 for a telephone number in the calling queue. In step 202, the processor places a call to the telephone extension 33 specified by the telephone number returned from the database 26. In step 204, the processor monitors the call to determine whether an answer supervision signal has been received. If not, in step 206 the processor determines whether a predetermined time limit or number of rings has been exceeded. If so, the processor 12 indicates that the call was not successful and in step 200 the processor 12 queries the database 26 for another number to call.

If the answer supervision signal is received in step 204, then in step 208 the processor 12 starts a timer. In step 210, the processor 12 determines whether speech or sound has been received. If not, in step 212 the processor 12 determines whether a preset time limit has been exceeded. If so, then step 200 resumes and the telephone database is queried for a new number. If the preset time limit has not been exceeded in step 212 then step 210 is resumed. If speech energy is detected in step 210 then in step 214, the processor notes the start time of the speech or restarts the timer and determines whether more than 4 seconds has elapsed since the beginning of speech energy was detected. The 4 second time interval is used to distinguish live callers from answering devices as was described previously with reference to the method steps following A in FIG. 5. If the elapsed time since speech began exceeds 4 seconds in step 214, then in step 216, the processor 12 waits for a period of silence which exceeds 3 seconds. If 3 seconds of continuous silence is not received in step 216, then the processor 12 continues to wait. Once a period of 3 seconds of continuous silence has been received in step 216, then the processor determines than an answering machine has received the call. Therefore, step 200 may being again in the event that the emergency delivery instruction specifies live delivery only. Alternatively, step 224 may begin if the emergency delivery instruction specifies that the message may be delivered to an answering device. In step 224, the processor 12 retrieves a message from the database 26. Then in step 226, the processor plays the message to the answering device. Subsequently, step 200 begins again.

In step 214, if the elapsed time since speech began is less than 4 seconds, then step 218 begins. In step 218, the processor 12 looks for a continuous period of silence of more than approximately 1.5 seconds. The period of 1.5 seconds is approximate and empirically determined to be the optimum period of silence based on the following tradeoff. The period of silence must be short enough to keep a live party from hanging up, and long enough to prevent falsely classifying answering devices as live parties. This tradeoff may vary based on the demographic of the called parties and other considerations. If a continuous period of silence of greater than 1.5 seconds has not been received in step 218, the processor 12 continues to wait for 4 seconds to elapse from the time that speech was initially detected. If in step 218, silence for more than 1.5 seconds does occur after the first 4 seconds or less of speech are detected as determined by step 214, then in step 220, the processor 12 retrieves a message from the database 26. Then in step 222, the processor 12 plays the emergency message to the live party. Subsequently, step 200 begins again. It should be noted that the message retrieved in step 220 which is to be played to a live party in step 222 may be different from the message retrieved from the database 26 in step 224. This feature allows the sender to customize a message for live delivery and a separate message for answering machine delivery. Additionally, the possibility exists for a live message to be played mistakenly to an answering machine. Similarly, the possibility exists for the answering machine message to be played to a live party, thus probably causing the live party to hang up the telephone.

If the instruction received by the processor 12 in step 100 of FIG. 4 is determined to be an instruction for live message delivery, then control is then passed to step 230 illustrated in FIG. 5. In step 230, the processor 12 determines whether the time for live delivery has arrived. In this regard, the instruction may specify hours during which live parties are likely to be present at the telephone extension corresponding to the telephone numbers stored in the database 26. The hours specified in the instruction may be notated as a blackout period during which calls are not to be placed. Either notation may include one or more blackout days and may take into account different time zones based on the location of the remote telephone extension corresponding to the telephone numbers stored in the database 26. Once delivery time has arrived as determined by step 230, step 200 begins. Steps 200–226 operate as described above. After step 222 or 226, the call is terminated and step 230 begins again.

Figure 6:
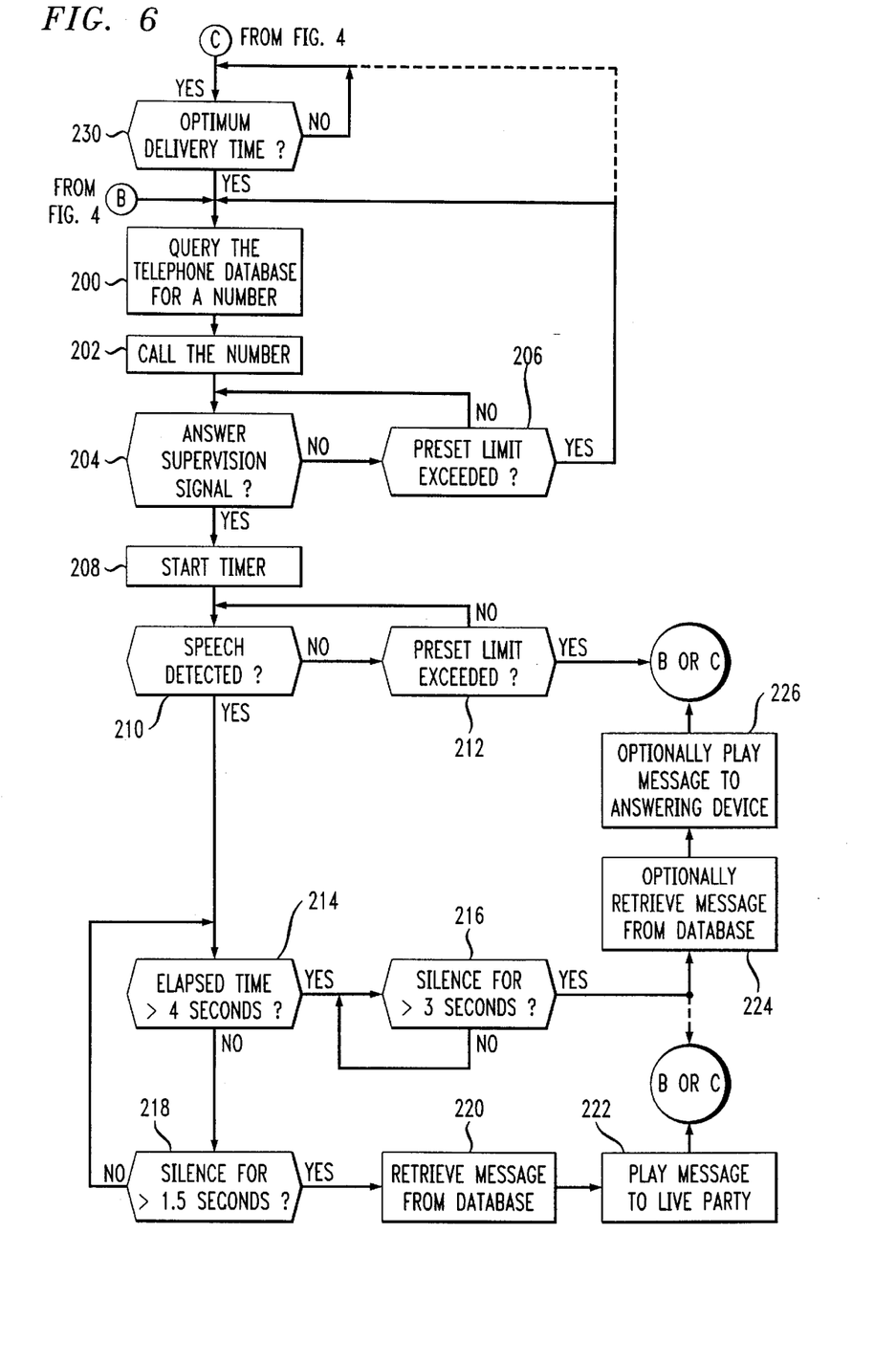
FIG. 6 depicts alternate methods of message delivery, that are not optimized for voice mail delivery.

The instructions for delivering messages as described with reference to FIGS. 4–6 are embodied within a message delivery program 24 which runs on processor 12. These instructions may be stored on a computer usable medium such as a disk 28 shown in FIG. 1. Alternatively, the program instructions may be stored in a database on a computer system coupled to the telecommunications network. Program instructions from the disk 28 or from a database on the network may then be uploaded to memory 18 for executing by the processor 12. In addition, it will be appreciated that multiple message delivery instructions of different types may be processed simultaneously by the processor 12.

Although specific embodiments of the present invention have been disclosed, it will be understood by one having ordinary skill in the art that changes can be made to those specific embodiments without departing from the spirit and scope of the invention.

What is claimed is:

1. A method of delivering a message to an automated voice messaging system coupled to a telephone extension over a network, comprising the steps of:

calling a telephone number retrieved from a database, the telephone number corresponding to the telephone extension;

monitoring the call for a beginning of speech energy after an answer supervision signal has been received;

monitoring the call from the beginning of the speech energy for a continuous silence interval having a duration that is independent of an elapsed time from the beginning of the speech energy, and the continuous silence interval being chosen to optimize delivering a message to the voice messaging system; and playing the message to the telephone extension after the continuous silence interval expires.

2. The method according to claim 1, wherein the continuous silence interval is between 1.5 and 5 seconds.

3. The method according to claim 1, wherein the continuous silence interval is between 2.7 and 3.5 seconds.

4. The method according to claim 1, wherein the continuous silence interval is about 3 seconds.

5. The method according to claim 1, further comprising the step of:

initiating steps (a)–(d) upon arrival of a start time specifying when a live party is unlikely to be present at the telephone extension.

6. The method according to claim 5, further comprising:

initiating steps (e)–(h) upon receipt of message delivery instruction specifying live delivery;

(e) calling a telephone number retrieved from the database, the telephone number corresponding to a telephone extension;

(f) monitoring the call for a beginning of speech energy after an answer supervision signal has been received;

(g) monitoring the call for not more than 1.5 seconds of continuous silence within the first 4 seconds from the beginning of the speech energy; and (h) playing a message to the telephone extension after the continuous silence expires.

7. The method according to claim 1, further comprising the step of:

flagging a message as having been delivered to a live party when the continuous silence interval occurs before 4 seconds of speech are detected after the beginning of the speech energy.

8. A system for delivering a message to an automated voice messaging system coupled to a telephone extension, comprising:

message means for storing a message;

a memory having a telephone database including a plurality of telephone numbers, and a voice mail delivery instruction, the voice mail delivery instruction specifying the message within the message means, at least one of the plurality of telephone numbers, and a start time specifying when a live party is unlikely to answer a call;

a network interface coupled to a telecommunications network that includes a plurality of telephone extensions; and a processor coupled to the message means, the memory and the network interface, the processor executing the voice mail delivery instruction in the memory and in response to arrival of the start time specified in the voice mail delivery instruction, the processor retrieving from the telephone database one of the plurality of telephone numbers, placing a call to a telephone extension corresponding to the retrieved telephone number through the network interface, and playing the message stored in the message means during the call after detecting a beginning of speech energy and thereafter a continuous silence interval from the telephone extension, the continuous silence interval having a duration that is independent of an elapsed time from the beginning of the speech energy and the continuous silence interval being chosen to optimize delivering the message to the voice messaging system.

9. The system according to claim 8, wherein the continuous silence interval is between 1.5 and 5 seconds.

10. The system according to claim 8, wherein the continuous silence interval is between 2.7 and 3.5 seconds.

11. The system according to claim 8, wherein the continuous silence interval is about 3 seconds.

12. A computer useable medium having computer program logic stored therein for enabling a computer to deliver messages to an automated voice messaging system coupled to a telephone extension, wherein the computer program logic comprises:

initiating means for enabling the computer to initiate automatic delivery of a message to a telephone extension upon arrival of a start time specifying when a live party is unlikely to be present at the telephone extension;

retrieving means for enabling the computer to retrieve from a telephone database one of a plurality of telephone numbers;

calling means for enabling the computer to place a call through a network interface to a telephone extension corresponding to the retrieved telephone number;

detecting means for enabling the computer to detect a beginning of speech energy and intervals of silence at the telephone extension; and playing means for enabling the computer to play the message to the telephone extension after the beginning of the speech energy is detected and after a continuous silence interval is detected, the continuous silence interval having a duration that is independent of an elapsed time from the beginning of the speech energy and the continuous silence interval being chosen to optimize delivering the message to the voice messaging system.

13. The method according to claim 12 wherein the continuous time interval is between 1.5 and 5 seconds.

14. The method according to claim 12, wherein the continuous time interval is between 2.7 and 3.5 seconds.

15. The method according to claim 12, wherein the continuous time interval is about 3 seconds.

\* \* \* \* \*